A. KINGSBURY.
BEARING.
APPLICATION FILED MAR. 14, 1918.
1,429,744.
Patented Sept. 19, 1922.
4 SHEETS—SHEET 1.
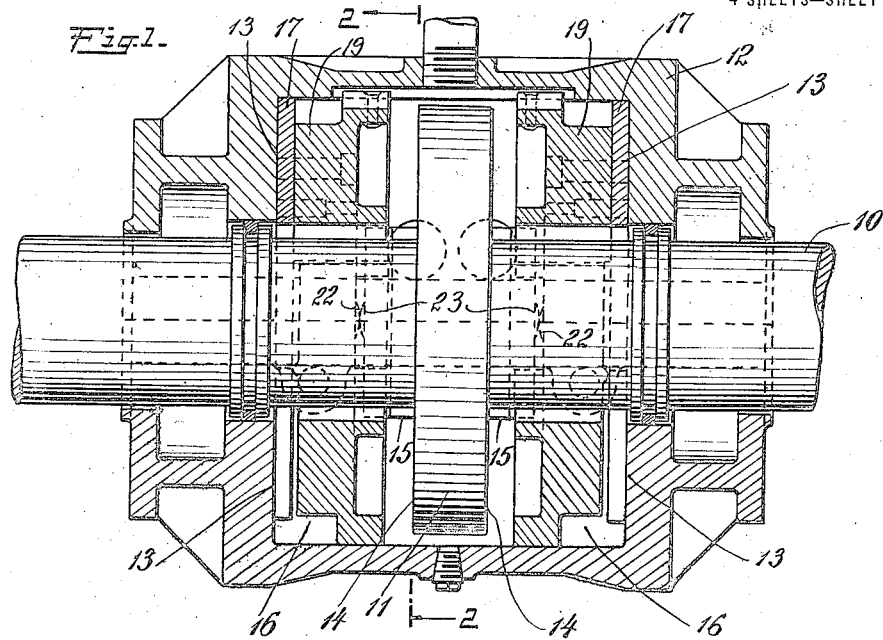
Fig. 1.
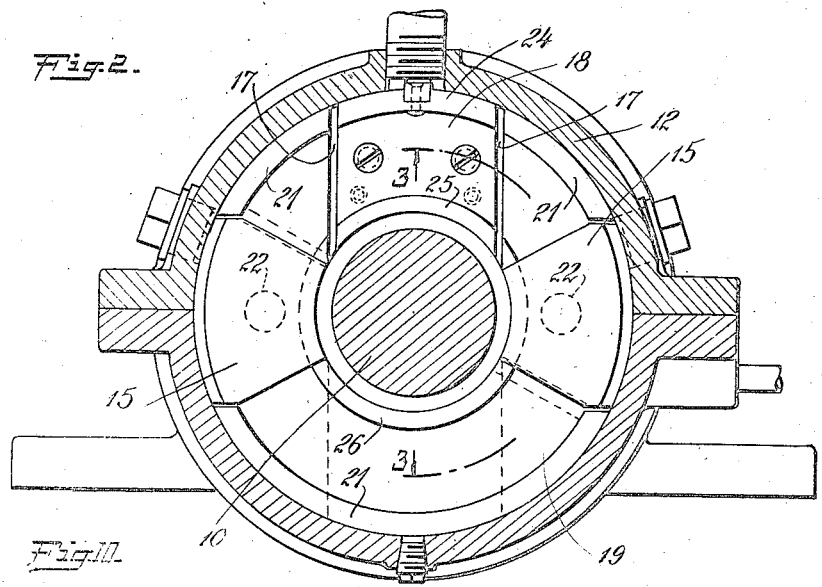
Fig. 2.
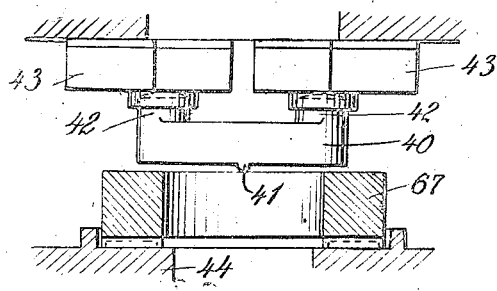
Fig. III.
INVENTOR
Albert Kingsbury
BY
Marshall & Dearborn
ATTORNEY

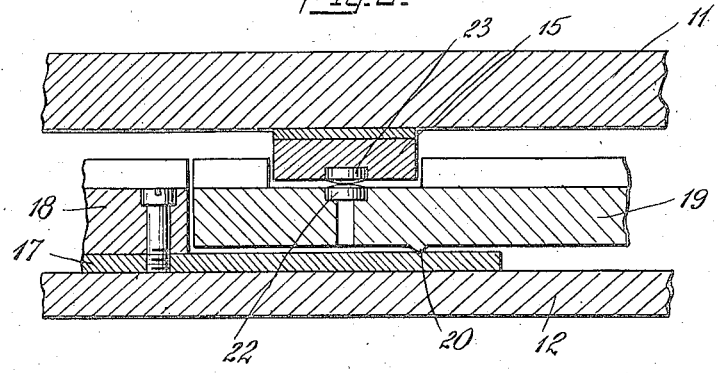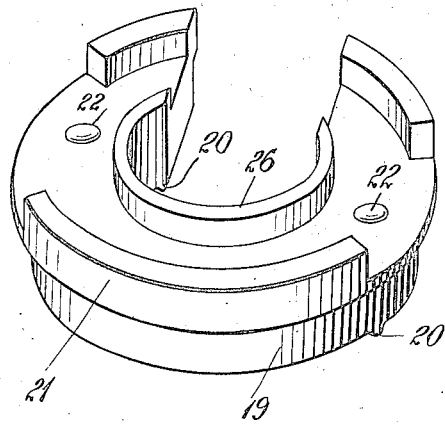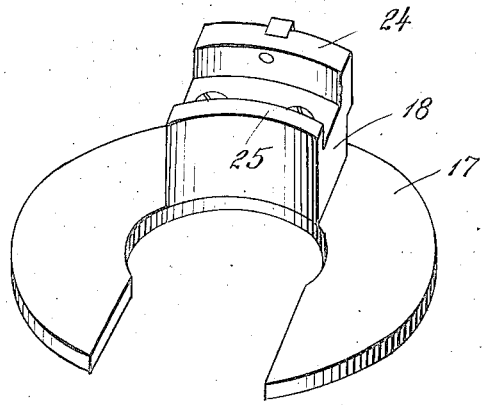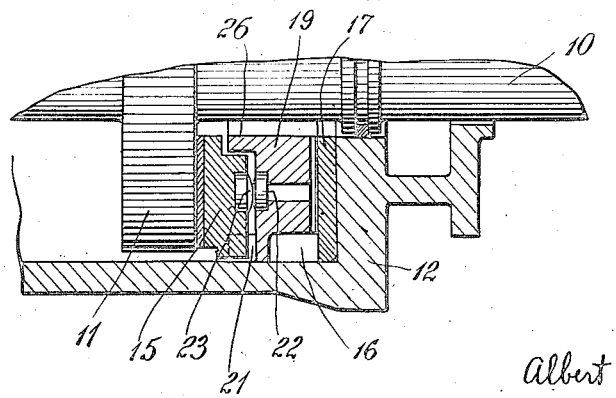

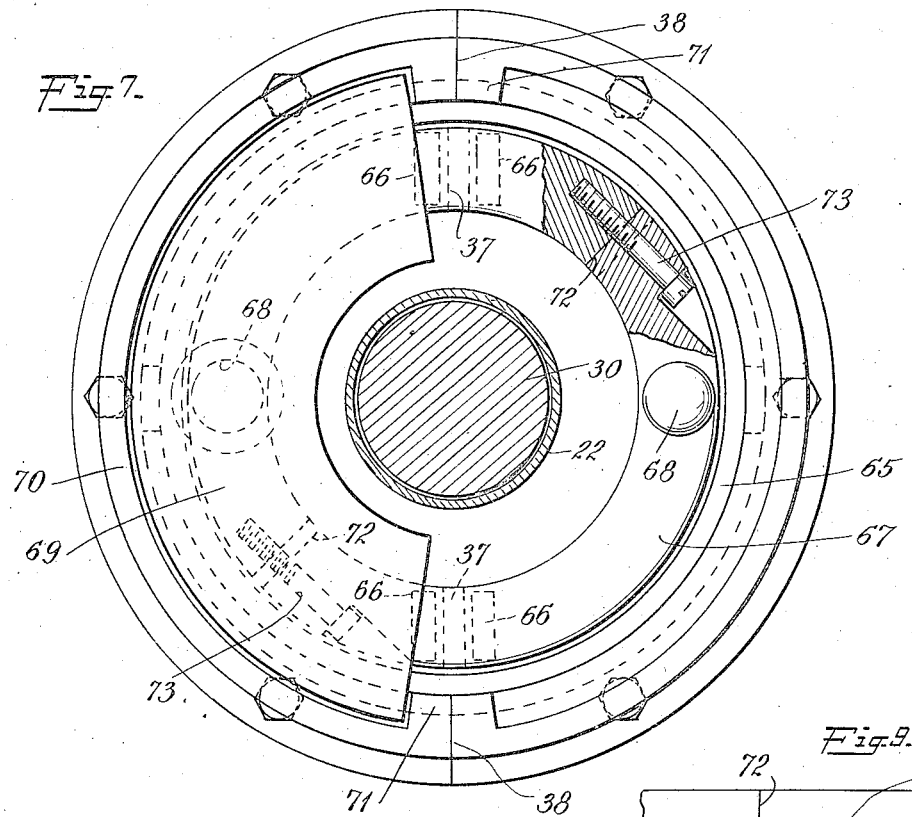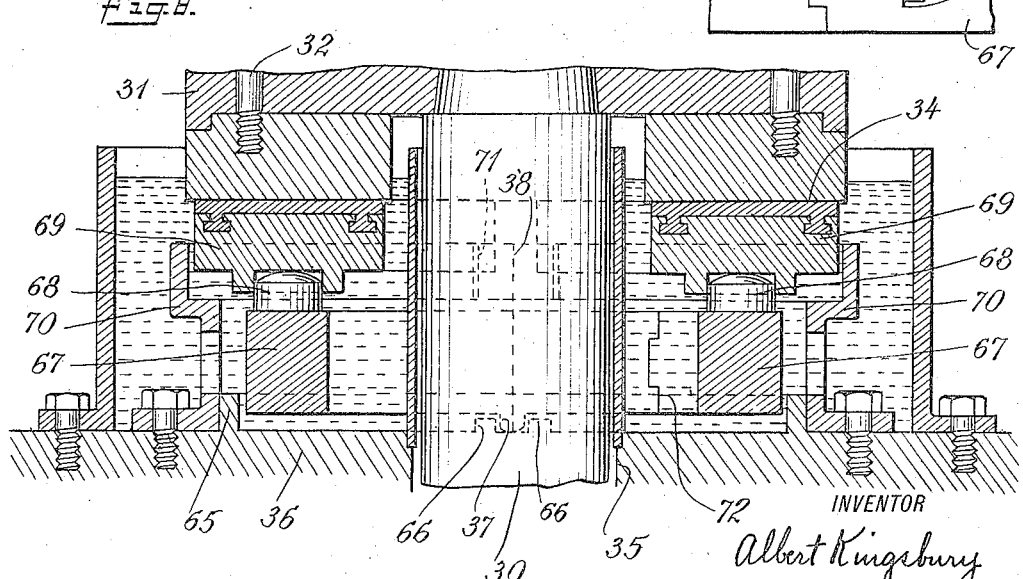

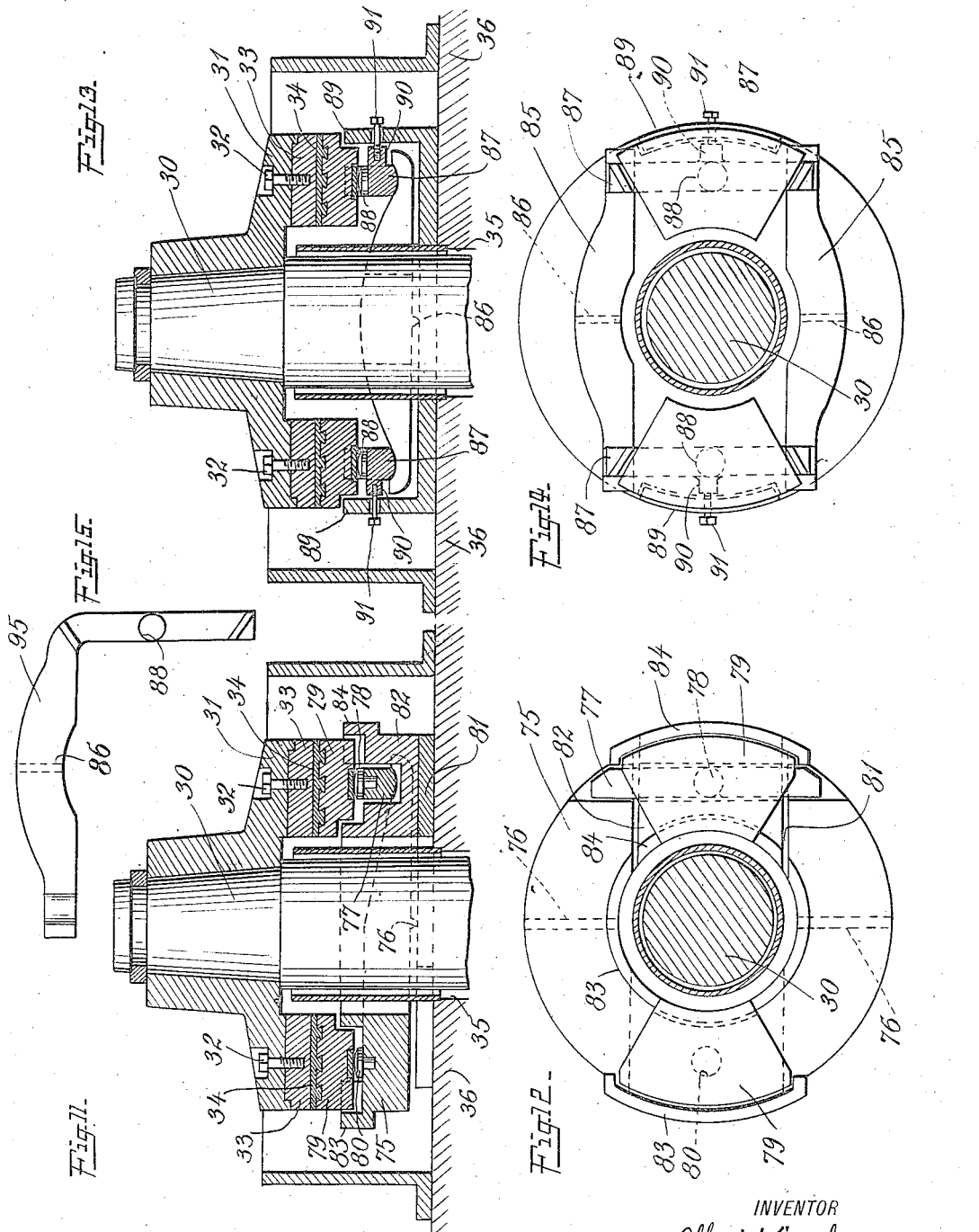

Patented Sept. 19, 1922.

1,429,744

UNITED STATES PATENT OFFICE.

ALBERT KINGSBURY, OF PITTSBURGH, PENNSYLVANIA.

BEARING.

Original application filed March 25, 1916, Serial No. 86,535. Divided and this application filed March 14, 1918. Serial No. 222,337.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and particularly to thrust bearings of the type employing tiltable bearing portions, segments, or shoes and wherein a lubricating film is automatically maintained between the bearing surfaces by the relative movement of the thrust supporting members.

This application is in part a division of my application Serial No. 86,535 filed March 25, 1916, and is in part a continuation of my copending application Serial No. 188,726 filed August 29, 1917.

It is sometimes desirable to utilize only two bearing portions, segments or shoe members for taking the thrust pressure in a bearing of the character above indicated, and my present invention has special reference to means for supporting two bearing portions, segments or shoe members, preferably tiltably, so as to equitably distribute the pressure between them; this distribution being effected practically without friction by the use of a pressure-distributing member having only one line or axis of pivotal movement. A pressure-distributing member having only one line or axis of pivotal movement is not claimed broadly herein; such being the subject of claims in my application Serial No. 188,726 above referred to; the present invention being directed more particularly to pressure-distributing members of this type which may be readily inserted into and withdrawn from position without disassembling the other members of the bearing.

Another object of my invention is to provide a simple and compact pressure-distributing or equalizing member which is so constructed and arranged as to conserve material while reducing the tendency of said member to become distorted.

In order that my invention may be thoroughly understood, I will now proceed to describe the same in the following specification, and will then point out the novel features thereof in appended claims. The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a longitudinal section of a horizontal thrust bearing arranged and constructed in accordance with my invention and constituting one embodiment thereof.

Figure 2 is a transverse section taken on the line 2—2 of Figure 1.

Figure 3 is a sectional detail taken on the line 3—3 of Figure 2 and developed into a single plane.

Figures 4–5 are perspective views showing parts of the pressure-distributing structure in detail.

Figure 6 is a sectional elevation of the bearing taken in a radial plane through one of the shoe pivots.

Figure 7 is a partially sectional plan view of the bearing shown in Figure 8, with one of the shoes removed to show the pressure-distributing ring.

Figure 8 is a sectional elevation of a vertical thrust bearing and illustrates another embodiment of my invention.

Figure 9 is a side elevation of a portion of the pressure-distributing member of Figures 7 and 8.

Figure 10 shows a portion of a bearing in which one of the oppositely disposed shoe members is divided or separated into two connected and coacting shoe elements, which together constitute a single tiltably supported unit or group.

Figures 11 and 13 are views which correspond to Figure 8 and which show other embodiments of my invention.

Figures 12 and 14 are partially sectioned plan views of the structures shown respectively in Figures 11 and 13.

Figure 15 is a plan view of a modification of one of the parts of the Figures 13–14 construction.

In the form shown in Figures 1 to 6 inclusive 10 designates a horizontal shaft having a thrust collar 11. A bearing housing 12 surrounds the thrust collar and the portions of the shaft adjacent thereto, and is preferably divided in a substantially horizontal plane into upper and lower sections as clearly shown in Figure 2.

The housing 12 is provided with thrust supporting surfaces 13 which are opposed to the thrust bearing surfaces 14 of the collar 11, a pair of bearing portions or segments, here shown as shoes 15, and a structure 16 for mounting the same being interposed on each side of the thrust collar between the surfaces 13 and 14.

The structure 16, in the form here shown, comprises an interrupted or segmental filler ring 17 having a filler block 18 attached thereto, and an interrupted pressure-distributing or equalizing ring 19 having knife edge projections 20, or other suitable supports, which are preferably in diametrical alignment and which provide a single pivotal axis on which said ring 19 may rock or tilt on said filler ring 17.

Ring 19, in the form shown, has a flange 21 which is cut away at opposite sides to receive the shoes 15 and is provided with a pair of inserts 22, preferably in the form of hardened blocks with spherically curved top surfaces on which the shoes are mounted. Each shoe preferably has a spherically curved insert 23 in its bottom surface which is arranged to cooperate with one of the inserts 22 and permit the shoe to tilt both tangentially and radially on said ring.

The points of pivotal support for the shoes are preferably diametrically opposite and are offset relatively to the knife edge projections 20 so that the tilting of the ring on the knife edge projections serves, in conjunction with the pivotal movement of the shoes themselves, to equitably distribute the pressure over the engaging surfaces of the shoes and the thrust collar.

Since the filler ring 17 and the ring 19 are both interrupted, it is easy to insert them in place, or to remove them for inspection or repairs, without disassembling the other members of the bearing. They are assembled as shown in Figure 3 with the block 18 set loosely into the opening in the ring 19. The block 18 may be provided with flanges 24 and 25 which are continuations of the flanges 21 and 26 of the ring 19 and which form, in conjunction therewith, an annular channel for the circulation of the oil under and around the shoe members 15—15.

Attention is also directed to the fact that, in the construction just described, the points of pivotal support for the shoes are relatively close to the knife edge projections on which the ring is supported, and there is therefore very little tendency for the ring to be distorted by the thrust pressures on the bearing members. For this reason the ring does not need to be as thick and strong as it must be when the line of the knife edges is at right angles to the line of the shoe supports.

The structure above described is also particularly well adapted for, although not restricted to use in, horizontal thrust bearings having a divided housing—such as is shown in Figures 1 and 2—since the upper half of the housing may be readily removed to give access to the shoes and the parts of the pressure-distributing structure, and permit them to be easily removed, whenever necessary, either collectively or individually. The stationary members have been shown as duplicated on opposite sides of the thrust collar 11, but such members may be provided on only one side of said collar if the thrust is to be in one direction only. It is also to be understood that, while illustrated in conjunction with a bearing for a horizontal shaft, the pressure distributing structure heretofore described is equally applicable to bearings for vertical shafts.

In the form shown in Figures 7 and 8, the structure comprises a vertical shaft 30 to which a thrust block 31 is attached. Removably secured to the thrust block, by bolts 32 or other suitable means, is a thrust collar 33 having a bearing surface 34.

The shaft extends through an opening 35 in a stationary frame or foundation 36 and the thrust collar 33 cooperates with a pair of bearing portions, segments or shoes 69.

The base 36 has an annular rib 65 and projections 66 and mounted upon this base is a pressure-distributing or equalizing ring 67 which has a knife edge or other suitable projections 37, preferably in diametrical alinement, and a pair of upwardly extending spherically faced lugs 68, which are located on opposite sides of the axis of the bearing and in the form shown midway between the knife edge projections which constitute the single pivotal axis of the ring.

The bearing shoes 69 are tiltably mounted on the lugs 68 and are held in place by an annular guide 70 which is provided with internally projecting lugs 71, 71 that engage with the ends of the shoes. The pressure distributing ring 67 is held in place by the cooperation of the projections 37 with the projections 66 on either side thereof and by the surrounding annular rib 65.

In order to make the ring 67 capable of ready removal I prefer to divide it transversely on a plane, such as 72, which is preferably located approximately midway between the planes of the points 68 and 37 of the shoe and ring supports. When so divided the abutting ends of the separable ring may be supported on each other by a simple tongue and groove joint, such as is shown in detail in Figure 9 (since the ring is subjected at these points to transverse shearing stresses only); but I prefer to secure the halves of the ring together by light screw bolts 73 which prevent any accidental separation or displacement of the parts.

In order to provide for the easy lateral removal of the divided ring 67—as well as the shoes 69 when desired—the annular guide ring 70 is preferably also split or divided diametrically—as on the plane 38, 38—so as to permit either half of the ring to be separably detached from the base frame 36, thus leaving one side of the annular channel, in which the pressure-distributing member and the shoes are enclosed, entirely open.

Instead of using one quite long shoe—such as is shown in Figure 7—on each side of the bearing shaft, I may use two or more shoes mounted in a single group or unit on each of the oppositely disposed pivot supports 68, in the manner illustrated in Figure 10.

In the form here shown the separate shoe elements 43, 43 of each group are pivotally supported on, and connected by, a block or lever 40, which is itself tiltably mounted, either on one of the spherical projections 68, or on a knife edge support 41 that is carried either by the ring member 67 or extends downwardly from the block 40 as shown.

Another single-axis pressure-distributing or equalizing structure for supporting a pair of bearing portions, segments or shoes on opposite sides of the shaft and in such manner as to permit of easy lateral removal of the parts, is shown in Figures 11 and 12. In the form here shown the structure comprises a pressure-distributing member 75, which has the form of an interrupted ring or horseshoe-shaped part—somewhat like that shown in Figure 4—which is tiltably mounted on downwardly extending ribs or projections 76 that form a single axis knife edge, or equivalent support, for the member. The projecting ends of the member 75 are preferably reduced in thickness and provided with rounded notches to receive the ends of the bridge bar 77 which is provided with an upwardly extending spherically-ended stud 78 on which one of a pair of bearing shoes 79 is tiltably mounted. The other shoe is mounted on the opposite side of the shaft on a similar stud 80 on the member 75.

The member 75 may be mounted either directly on the base or on a filler block 81 having a guide projection 82 similar to the structure shown in Figure 5. Both the member 75 and the filler block projection are provided with upwardly extending annular flanges 83, 83, and 84, 84 which embrace the inner and outer edges of the shoes 79 and hold them against rotation with the thrust collar.

In the form shown in Figures 13 and 14, the pressure-distributing or equalizing member comprises a pair of tiltable blocks 85 disposed on opposite sides of the shaft and a pair of bridge blocks 87. The blocks 85 are mounted at their centers on knife edge projections or equivalent supports 86 that are preferably in diametrical alignment. They are also preferably provided at their outer ends with transverse grooves in which the bridge blocks 87 are seated. Each bridge block is shown as provided with a rounded projection 88 on which one of the oppositely disposed bearing shoes is mounted in such manner as to rock or tilt freely in all directions. The bearing shoes are held in proper position on their supports and are prevented from rotation with the thrust collar 33 by means of annular flanges 89, 89 that extend upwardly from the base ring 36 and engage loosely in segmental recesses in the lower outer edges of the shoes. In some cases I find it desirable to provide each bridge block 87 with lugs 90 which are tapped to receive the ends of bolts 91 that pass loosely through holes in the flanges 89 and serve to prevent any accidental overturning of the bridge blocks 87.

In the form shown in Figure 15 each side bar is united at one end to one of the bridge blocks so as to form an L-shaped pressure-distributing element 95 that is provided at the center of its long leg with a transverse knife edge support 86, and at the center of its short leg with a spherical projection 88 that constitutes, as before, the pivot support for one of the bearing shoes. The end of the long leg of the L is provided with a transverse groove to receive the end of the short leg of the second L-shaped element which is oppositely disposed on the other side of the shaft with its knife edge support preferably in diametrical alignment with the corresponding support 86.

In both the constructions last described the bars 85, 85, and 87, 87 (or the two L-shaped bars 95) constitute a "cradle" support for the two oppositely disposed bearing shoes; and the rocking movement of the cradle on its single knife edge line of support serves, in conjunction with the tilting movement of the shoes, to equitably distribute the thrust pressures over the bearing surfaces in substantially the same manner as that result is accomplished in the constructions illustrated in Figures 1 to 6, and 7 to 9, hereinbefore considered.

The structures of Figures 11, 12, and 13, 14, 15, also possess the characteristic of permitting the easy removal of the separable pressure-distributing member by a simple lateral or sidewise movement of the divisible elements to one side of the shaft.

The term "knife-edge support" is used herein broadly to mean any suitable mounting which permits the pressure-distributing member to tilt about a single axis or line; therefore it is evident that the supporting projections may be of any desired shape and form that will accomplish that result, and may be provided on either of the opposed coacting members. So also the projections mounting the bearing portions, shoes, or segments on the pressure-distributing members may be provided on either of said parts.

While the bearing segments have been shown as of equal area, and the axis about which the pressure-distributing member tilts has been shown as passing through the axis of the shaft, such arrangement is not essential as it is apparent that said areas may differ or said axis may be laterally displaced to a suitable extent to secure differential sustaining pressures. Furthermore, while the improved pressure-distributing member has been shown as applied only to the stationary of the relatively rotatable bearing members, it is apparent that, by suitable variation, it could be employed in conjunction with tiltable bearing segments constituting a part of the rotatable member.

The arrangement of the tilting axis of the pressure-distributing member at right angles to the line on which the bearing segments are mounted on said member, as shown in Figs. 7 to 15, is not specifically claimed herein but forms the subject of claims in my application Sr. No. 188,726, above identified.

Structures of preferred form and construction have been illustrated and described for the purpose of showing ways in which this invention may be used, but the inventive thought upon which this application is based is broader than these illustrative embodiments thereof, and I therefore intend no limitations other than those imposed by the appended claims.

What I claim is:

1. A bearing comprising a pressure-distributing member tiltably-mounted on a single axis, said member being divisible to permit radial removal of parts thereof, and bearing segments mounted on said pressure-distributing member.

2. A bearing comprising a pressure-distributing member embracing the shaft and tiltably-mounted on a single axis, said member being constructed to be removed radially of the shaft, and bearing segments mounted on said member on opposite sides of the shaft.

3. A bearing comprising a pressure-distributing member extending on opposite sides of the shaft and tiltably-mounted on a single axis, said member being removable by movement radially of the shaft, and bearing segments tiltably-mounted on said member.

4. A bearing comprising a pressure-distributing member embracing the shaft and tiltably-mounted on a single axis, said member being laterally removable from the bearing, and two bearing segments mounted on said member on diametrically opposite sides of the shaft.

5. A thrust bearing comprising a shaft having a thrust collar, bearing shoes cooperating therewith, and an equalizer for supporting the shoes, comprising a tiltably supported horseshoe-shaped member extending on opposite sides of said shaft.

6. A thrust bearing comprising a stationary member, a shaft having an annular thrust surface, a pair of bearing shoes cooperating with said surface and disposed on opposite sides of the shaft, and means for supporting the shoes and distributing the pressure thereon, comprising an open ring member tiltably mounted on the stationary member of the bearing.

7. A thrust bearing comprising a stationary member, a shaft having an annular thrust surface, a pair of bearing shoes cooperating with said surface and disposed on opposite sides of the shaft, means for supporting the shoes and distributing the pressure thereon, comprising an open ring member tiltably mounted on the stationary member of the bearing, and a filler member having a projection adapted to substantially complete said ring when assembled in position.

8. A thrust bearing comprising a ring-shaped equalizer having a knife edge support and bearing shoes mounted on the equalizer near the line of support and on opposite sides thereof.

9. A thrust bearing comprising a ring-shaped equalizer having a diametrical knife edge support and bearing shoes mounted on the equalizer near the line of support and at diametrically opposite points on the ring.

10. A thrust bearing comprising a shaft having a thrust bearing member and a relatively stationary cooperating bearing member, one of said members comprising an equalizer substantially concentric with the shaft and mounted on a knife edge support, and a pair of bearing shoes tiltably mounted thereon on a line making an acute angle with the knife edge support.

11. A thrust bearing comprising a shaft having a thrust bearing member and a relatively stationary cooperating bearing member, one of said members comprising an equalizer substantially concentric with the shaft and mounted on a knife edge support, and a pair of bearing shoes mounted for both radial and tangential tilting on the equalizer on a line making an acute angle with the knife edge support.

12. A thrust bearing comprising a shaft having a thrust collar, an open equalizer extending on opposite sides of the shaft and having a knife edge support in a diametrical plane, and bearing shoes mounted on the equalizer on opposite sides of the axis of its support.

13. A thrust bearing comprising a shaft having a thrust collar, an open equalizer extending partially around the shaft and having a knife edge support in a diametrical plane, and bearing shoes mounted on the equalizer on opposite sides of the axis of its support and at opposite points relative to the center of the shaft.

14. An equalizer means for thrust bearings comprising a curved filler block adapted to partially surround the shaft and an interrupted equalizer ring having supporting projections adapted to be mounted on the filler block, the filler block having a projection adapted to substantially complete the equalizer ring when assembled in position.

15. The combination of a substantially horizontal shaft having a thrust collar, a two-part housing surrounding the collar and the adjacent portions of the shaft, a filler block in the form of an interrupted ring removably mounted in the housing and partially surrounding the shaft, an equalizer removably mounted in the housing between the filler block and the adjacent surface of the thrust collar, a knife edge support for the equalizer, and bearing shoes cooperating with the thrust collar and mounted on the equalizer on opposite sides of the axis of the support.

16. The combination of a substantially horizontal shaft having a thrust collar, a two-part housing surrounding the collar and the adjacent portions of the shaft, a filler block in the form of an interrupted ring removably mounted in the housing and partially surrounding the shaft, an equalizer removably mounted in the housing between the filler block and the adjacent surface of the thrust collar, a knife edge support for the equalizer, and bearing shoes cooperating with the thrust collar and mounted on the equalizer on opposite sides of the axis of the support, said equalizer being arranged to hold the shoes in position.

17. In a thrust bearing, the combination of relatively rotatable bearing members comprising a pair of bearing shoes arranged on opposite sides of the shaft, and an equalizer member arranged to tiltably support the said shoes and adapted to be removed laterally from the bearing without disturbing either of the said bearing members.

18. In a thrust bearing, the combination of a thrust collar secured to the shaft, a stationary base ring, a pair of bearing shoes arranged on opposite sides of the shaft, and an equalizer member for said shoes adapted to be laterally removed from the bearing without disturbing either the thrust collar or the base ring.

19. A thrust bearing comprising a stationary member, a shaft having an annular thrust surface, a pair of bearing shoes cooperating with said surface and disposed on opposite sides of the shaft, means for supporting the shoes and distributing the pressure thereon comprising an open ring member tiltably mounted on the stationary member of the bearing, and means associated with said ring and adapted to substantially complete the same when assembled in position.

20. In a thrust bearing, the combination of relatively rotatable bearing members provided with bearing surfaces which engage with each other on opposite sides of the shaft, and a divisible member mounted to rock about a single line of support and adapted to equitably distribute the thrust pressures on the oppositely disposed bearing surfaces.

21. In a thrust bearing, the combination of a thrust collar secured to the shaft, a stationary base ring, a pair of bearing shoe members located on opposite sides of the shaft, and a divisible equalizer member interposed between the shoes and the base ring and adapted when divided to be laterally removed and replaced without disturbing the thrust collar or the base ring.

22. In a thrust bearing, the combination of relatively rotatable bearing members including bearing segments on opposite sides of the shaft, and an equalizer member surrounding the shaft and adapted to equalize the bearing pressures on said bearing engagement, the said equalizing member being separable into elements each of which can be removed laterally from the bearing without displacement of the other members of the bearing structure.

23. A bearing comprising a pressure-distributing member tiltably mounted on a single axis, and two diametrically opposed bearing segments mounted on said member on a line making an oblique angle with said axis.

24. A bearing comprising relatively rotatable bearing members including bearing segments, and pressure-distributing means for said bearing segments comprising a tiltably-mounted interrupted-ring member.

25. A bearing comprising relatively rotatable bearing members including bearing segments, and pressure-distributing means for said bearing segments comprising an interrupted annular member and means for mounting the same to tilt about a single axis.

26. A bearing comprising a pressure-distributing member tiltably mounted on a single axis, and bearing segments mounted on said member on a line making an oblique angle with said axis.

27. In a bearing, relatively rotatable bearing members including bearing segments on opposite sides of the shaft, and pressure-distributing means for said segments comprising a tiltably-mounted member adapted to be removed radially from the bearing.

28. In a bearing, relatively rotatable bearing members including bearing segments on opposite sides of the shaft, and a pressure-distributing member for said segments tiltably-mounted on a single axis and having an interruption adapted to permit the insertion and removal of said member by movement transversely of the shaft.

29. In a bearing, relatively rotatable bearing members including bearing segments, and a tiltable-pressure-distributing member for said segments, said pressure-distributing member being divisible to permit removal of its parts radially of the bearing.

30. Pressure-distributing means for thrust bearings comprising an interrupted member adapted to extend on opposite sides of a shaft and provided with projections whereby the same may tilt about a single axis.

31. Pressure-distributing means for thrust bearings comprising separable members tiltable about a single axis and adapted to be inserted into and withdrawn from operative position by movement transversely to the axis of the shaft.

32. A thrust bearing comprising a shaft having a thrust bearing member and a relatively stationary cooperating bearing member, one of said members comprising an interrupted annular pressure-distributing member embracing the shaft and tiltably mounted on a single axis, and bearing segments mounted on said member on opposite sides of said axis.

33. A thrust bearing comprising relatively rotatable bearing members including bearing segments, and pressure-distributing means for said bearing segments comprising a tiltably-mounted interrupted-ring member, and means associated with said member for completing said ring.

34. In a thrust bearing, the combination of relatively rotatable bearing members including bearing segments on opposite sides of the shaft, and pressure-distributing means for said segments comprising an interrupted-ring member adapted to be removed laterally from the bearing.

35. In a thrust bearing, the combination of relatively rotatable bearing members, including bearing segments, and pressure-distributing means for mounting said segments comprising a member extending on opposite sides of the shaft and removable laterally from the bearing without displacing the bearing parts.

36. In a thrust bearing, the combination of relatively rotatable bearing members including bearing segments, and pressure-distributing means for mounting said segments comprising means surrounding the shaft and removable laterally from the bearing without displacing the bearing parts.

37. In a thrust bearing, the combination of relatively rotatable bearing members including bearing segments, and pressure-distributing means for mounting said segments comprising a divisible member removable laterally from the bearing without displacing the bearing parts.

38. In a bearing, relatively rotatable bearing members including bearing segments, and a tiltably-mounted pressure-distributing member for said segments, said member embracing the shaft and being constructed for removal transversely of the axis of the shaft.

39. In a bearing, relatively rotatable bearing members including bearing segments on opposite sides of the shaft, and a tiltably-mounted pressure-distributing member having an interruption adapted to permit the insertion and withdrawal of said member by movement transversely of the shaft.

40. A bearing comprising a pressure-distributing member tiltably mounted on a single diametrical axis and bearing segments mounted on said member on a line making an oblique angle with said axis.

In witness whereof, I have hereunto set my hand this 12th day of March, 1918.

ALBERT KINGSBURY.